July 18, 1950 V. M. BOOKER 2,515,367
COOLING TRAY FOR BEVERAGE GLASSES AND THE LIKE
Filed Oct. 20, 1948 2 Sheets-Sheet 1
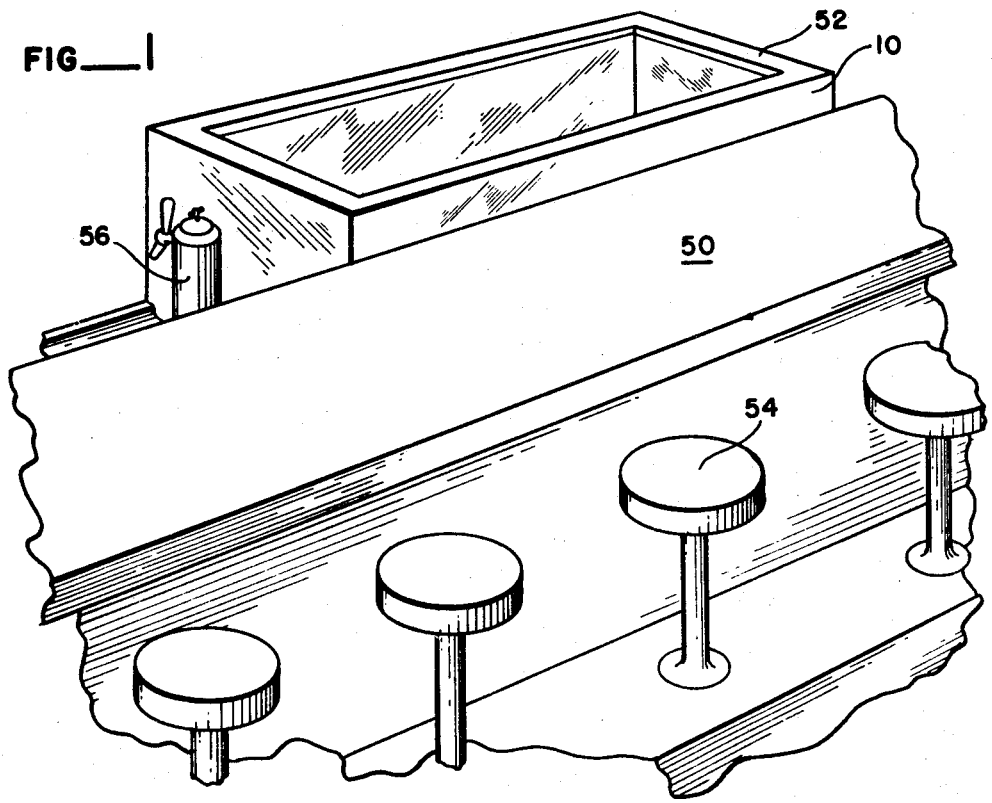
FIG.—1
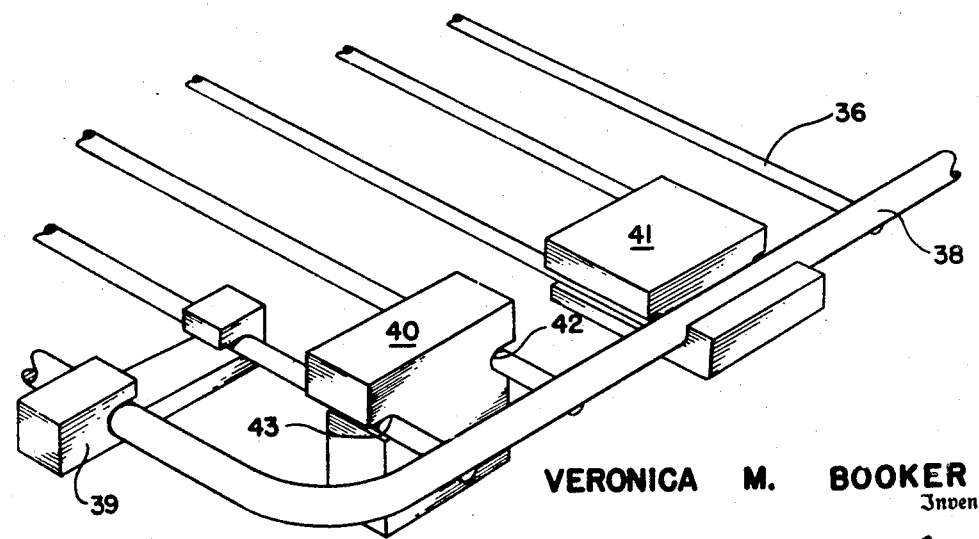
FIG.—2
VERONICA M. BOOKER
Inventor
By Smith & Tuck
Attorneys July 18, 1950   V. M. BOOKER   2,515,367
COOLING TRAY FOR BEVERAGE GLASSES AND THE LIKE
Filed Oct. 20, 1948   2 Sheets-Sheet 2
FIG._3
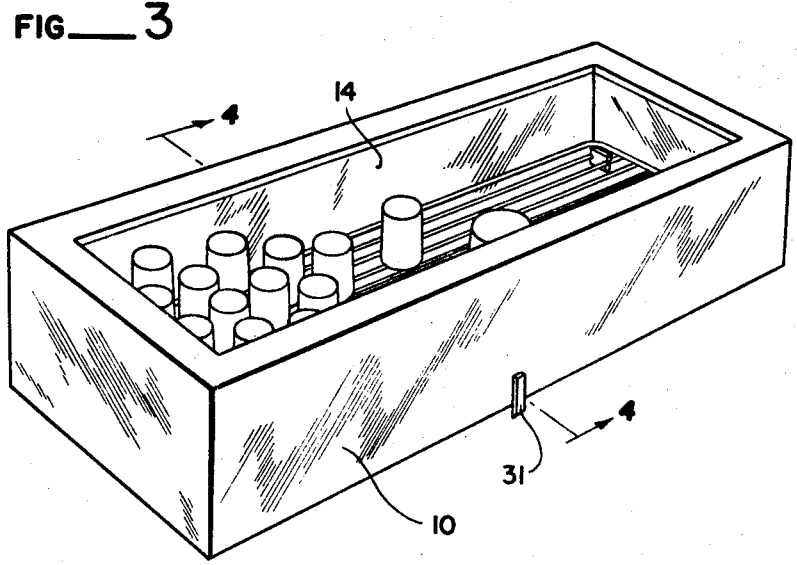
FIG._4
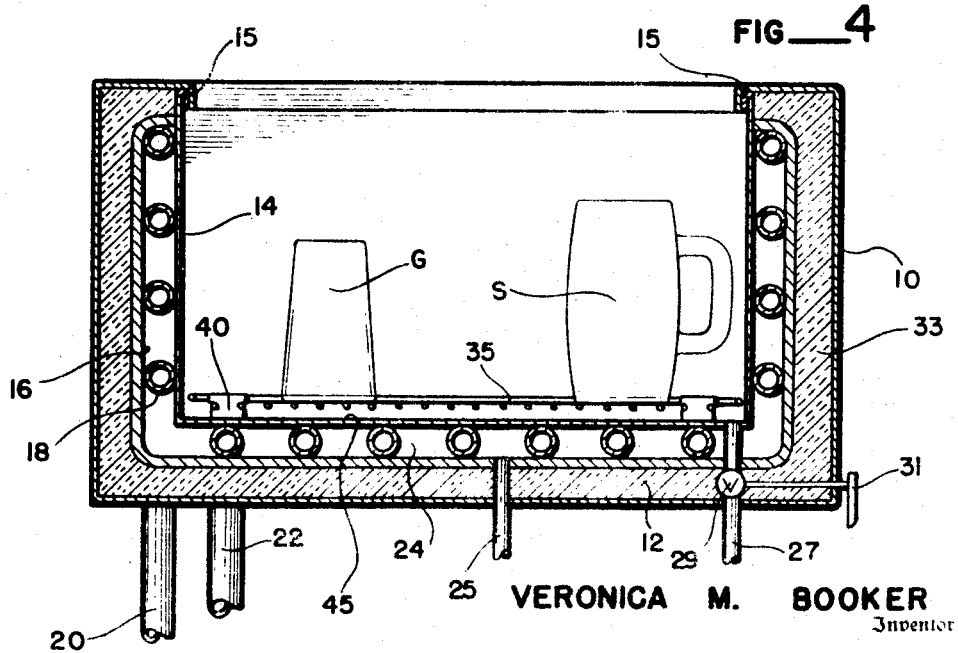
VERONICA M. BOOKER
Inventor
By Smith & Tuck
Attorneys Patented July 18, 1950

2,515,367

UNITED STATES PATENT OFFICE 2,515,367

COOLING TRAY FOR BEVERAGE GLASSES AND THE LIKE

Veronica M. Booker, Seattle, Wash.

Application October 20, 1948, Serial No. 55,600

3 Claims. (Cl. 62—89.5)

There have been produced quite a large variety of open-topped refrigerating trays, normally for the display in stores of vegetables, frozen foods, cheese and other food items, which require refrigeration to preserve their keeping qualities. Repeated trials by owners of taverns and other places serving cold beverages, have proved that none of the existing equipment meets the need of these establishments. Therefore, in my present invention I have made use of many of the well known principles of the open-tray refrigerating cabinet but have provided means which have overcome the objections of the former equipment, and which now adequately and fully serves the need of the tavern owner. In the serving of beer particularly, it is desirable that the beer itself be retained at a medium temperature. By that is meant, at temperature where the beer is palatable and pleasant to taste and is definitely a cooled drink, but the temperature should be kept within such bounds that the carbon dioxide contained in the beer will be freed to a limited extent when the beer is served so that an adequate head or topping of foam can be provided with each glass served. In the past this was largely achieved by having the beer colder than desired by most patrons, and then putting it in beer glasses which are normally, relatively heavy, and this is particularly true where the large glasses or steins are used, and which glassware is stored in the open and is definitely at room temperature. This had the over-all effect of definitely warming up the beer as it was served, due to the transfer of heat from the glass to the beer. Now in my present arrangement it is possible to maintain the glasses at the same temperature as the beer, not too cold that it will be unpleasant when applied to the lips, but by keeping the temperature substantially that of the beer, there is no warming effect on the beer, and it can thus be maintained at a temperature where effervescense will be satisfactory when the beer is served. Many times patrons who are served beer, which soon loses its head of foam, are inclined to feel that the beer is flat or stale, when actually this may not be the case, but that the beer is actually so cold that the included carbon dioxide, which is the effervescent agency, is so fully contained within the liquid that the original foam head when it is lost, is not re-supplied by bubbles coming up through the beer. My present equipment obviates these deficiencies.

The principal object of my present invention is therefore, to provide a cooling cabinet in which glassware can be maintained at a temperature comparable to the beverage that is to be served in it.

A further object of my invention is to provide an open cooling tray for beverage glasses and the like, which will be in the full view of the customers so that they can quickly see that this particular establishment is providing a high order of service.

A further object of my invention is to provide storage for beverage glasses which will hold them at a temperature substantially below room temperature, so that when a glass is raised from the cold storage it will, when it comes in contact with the warm air of the room, become immediately frosted, a characteristic that is very impressive to a patron as it definitely shows the temperature of the glass, yet when the beer is placed in the same it soon becomes clear and to all intent and purposes, just as attractive a serving as the older style, while still preserving all the characteristics and advantages of the cool glass.

A further and very important object of my invention is the provision of means whereby the glasses and beer steins and the like, are supported on a rack which is insulated from the normally frosted lining of the cabinet to the end that there will be no metallic thermal conduction of heat to it, and therefore the temperature of the glass throughout its entirety will be the same and without any danger of the glasses themselves at any time being frozen to the top of the glass supporting rack.

A further object of my invention is to provide means whereby the interior lining and the refrigerant coils may be defrosted each day when the tavern is closed and, further, the provision of drains and the like, so that no attention is necessary during this period of the process.

Further objects, advantages and capabilities will be apparent from the description and disclosure in the drawings, or may be comprehended or are inherent in the device.

Figure 1 is illustrative perspective view showing the preferred position of my cooling tray in its immediate association with a tavern bar.

Figure 2 illustrates in fragmentary perspective view one of the supporting corner members used to insure that there will be no metallic contact between the supporting tray and the metal lining of the cabinet.

Figure 3 is a perspective view showing my tray and the manner in which the glasses are stored in the same, and the same being substantially as viewed by the customers when entering a place equipped with my trays.

Figure 4 is a vertical cross sectional view taken along the plane indicated by the line 4—4 of Figure 3.

Referring more particularly to the disclosure in the drawings, the numeral 10 designates the outer shell or enclosing envelope for my tray. This may vary somewhat in order to make it blend in with the general equipment scheme of the establishment in which it is employed. I have found that stainless steel or the rustless metal alloys are usually both acceptable, however, there may be instances where it will be more desirable to enamel the metal housing, so as to make it blend in with other equipment. This may be an enameling of white, for instance, or it may be made in a tone to blend with the natural wood of the establishment. It will be noted, particularly from Figures 3 and 4, that the tray is elongated rectangular in form and is relatively shallow, and has a bottom that is merely thick enough to enclose the desired insulating material 12. The purpose of this will probably be best understood by reference to Figure 1, where the tray is shown in one of the preferred arrangements, in that while the tray is well within the line of vision of the patrons of the establishment, and normally inasmuch as there is usually adequate refrigerating facilities in the ordinary tavern, the tray can thereby be made shallow and set on top of the usual storage cabinets which are employed behind the bar or counter of such places. It has been found that the height of the storage space within the cabinet should not be more than 50% greater than the tallest glass employed. This is ample depth to insure adequate cooling of the glasses and enables the patrons of the establishment to actually see the glasses in the tray, which is a matter of considerable concern to the owner of the establishment.

Enclosed within the outer casing 10 is an inner liner 14. This I prefer to form of untreated metal, and to have it form a water-tight enclosure for the storage compartment proper. I have shown, as in Figure 4, how the outer casing 10 over-laps the upper margin of the inner lining. This is a matter of utility and also provides a rim around the inside which is of different metal. An insulating gasket or spacer 15 prevents contact between shell 10 and lining 14. The overlay thus normally does not become frosted, particularly if the same is highly polished.

Disposed between the outer shell 10 and the inner lining 14 is a preferably non-metallic inner lining 16. This lining is spaced sufficiently far from the inner lining 14 on the sides and at the bottom so as to provide a chamber adapted to receive refrigerating coils 18. These coils are supplied with refrigerant from an outside source, as through pipes 20 and 22. A suitable drain is provided for the cooling coil chamber 24 as the discharge tube 25. To provide means for the draining of the glass storage compartment of my refrigerating tray I have provided a drain 27. This drain is to take care of the melted condensate or the frost that must be disposed of periodically by defrosting and also is the drain for periodical washing of the storage chamber, and to this end it is desirable that a valve 29 be provided, which should have a convenient exterior handle as 31.

Disposed between the non-ferrous lining 16 and the outer shell lining 10 is suitable thermal insulating material 33. While there are many types of materials suitable for such insulation, I desire to use one of the various types having relatively small air cells to the end that minimum thickness of insulating materials can be employed. By having an insulating material of high efficiency per unit thickness, and further by having the lining 16 of non-ferrous material, I am able to reduce to the minimum any interference with the cooling of the inside of the tray by room temperatures, and do this with the minimum thickness over-all of the insulating material. To carry this thought further, I prefer to use a relatively large number of smaller diameter refrigerating tubes 18, so that again, the bulk of the tray can be kept to a minimum yet not sacrificing efficiency in operation.

Inasmuch as one of the principal objects of my invention is to provide means for uniformly cooling a beverage glass or container, as a whole rather than, for instance, especially chill the upper margin that engages the patron's lips, I have found it necessary to take unusual precautions that are not normally associated with this type of construction. I achieve my uniform cooling by providing that the beverage glasses G or steins S be supported by a grill 35. This grill can be made most economically, normally of light metal wires 36, which are welded or otherwise secured to a heavy marginal wire or frame 38. It is very essential in order to prevent frosting of this grill, to provide definite non-metallic support and insulating members 39, 40 and 41. Rubber, or rubber-like material is normally best, in that following the teachings shown in Figure 2, notches may be provided at 42 and 43, so that the members can be inserted as shown by placing the same on edge between adjacent wires, and then twisting the same to secure them in place. In Figure 2 I have illustrated block 39 and block 41. Normally a plurality of such blocks will be used on each of the sides and ends respectively to insure adequate spacing of the rack from the inner lining 14. Experience has shown that if a space of ¾ of an inch or more, is provided between the individual wires 36 and the lining 14 of the storage chamber, that no frosting will occur on the grill itself, and thus no unusually low temperatures will be applied to the glass resting on it.

*Method of use*

The manner of using my glass cooling tray will probably be fully understood from a study of Figure 1. In this figure it will be noted that my cooling tray is set behind the surface of bar 50, with one wall 10, normally snugly abutting the same. The top of my tray as 52, may be flush with the bar, or preferably just slightly above the same, following the general proportions of Figure 1. In this arrangement, patrons seated on stools 54 will see the display of the glasses within the frost lined cabinet. The glasses themselves as viewed are clear, yet the frosted surface of walls 14 definitely indicate that they are cold. When the bartender lifts a glass out of the tray it immediately takes on a frosted appearance due to the rapid condensation of water vapor in the warmer air as it meets the cold glass. This is a phenomena that excites curiosity and brings forceably home to the patron that an unusual service is being rendered in the establishment in question. As soon as the bartender fills the glass with beer as from the spigot 56, the effect is to bring the temperature of the glass quickly up to that of the beverage, and when that occurs the glass clears again. All these points are clearly indicative of a new method of appealing to the patron, and being particularly pleasing to the patron, tends to raise the level of the environment in taverns and the like, so as to relieve them, to a large degree, of the feeling of disrepute in which they, in the past, have been so often viewed.

In order to fully reap the benefits of my present invention, the user of this equipment must have a unit that can, by virtue of its compact design, be fitted into the existing bar equipment. It is for this reason that factors of compactness, the shallowness of the cooling chamber itself, and the ease with which the frosting and cleaning can be achieved, all combine to produce a new item of bar equipment.

It is believed that it will be clearly apparent from the above description and the disclosure in the drawings that the invention comprehends a novel construction of a cooling tray for beverage glasses and the like.

Having thus disclosed the invention, I claim:

1. An open refrigerated cooling tray for beverage glasses, consisting of: a shallow rectangular metal tray lining; refrigerating coils beneath and around said tray lining formed of a plurality of turns or relatively small tubing; an interliner of non-metallic material providing a complete tray, including the refrigerating coils and adapted to provide collection and drainage for the frosted liquids as they are periodically defrosted; thermal insulating material above, around and beneath said non-metallic lining; an outer sheathing forming in itself a complete and third tray, providing a cover and a downwardly extending lip adapted to fit over and inside of the inner lining of the tray; a rack adapted to support beverage glasses and containers; resilient spacing and insulating blocks adapted to space said rack from the inner walls of said tray and from the bottom of said tray; said blocks having opposed grooves adapted to engage adjacent wires of said rack and provide a definite positioning means for said blocks, a drain line from the glass cooling chamber of the tray, and a valve in said line outside of said tray.

2. An open refrigerated cooling tray for beverage glasses, consisting of: a shallow rectangular metal tray lining; refrigerating coils beneath and around said tray lining formed of a plurality of turns of relatively small tubing; an interliner providing a complete tray, including the refrigerating coils and adapted to provide collection and drainage for the frosted liquids as they are periodically defrosted; a drain pipe passing through the bottom of said interliner and discharging outside said interliner tray; thermal insulating material around and beneath said interliner; an outer sheathing forming in itself a complete and third tray, providing a cover and a downwardly extending lip adapted to fit over and inside of the inner lining of the tray; a rack adapted to support beverage glasses and containers; insulating means adapted to space said rack from the inner walls of said tray; insulating means adapted to rest on the bottom of said tray and space the rack therefrom; a drain line from the glass cooling chamber of the tray, and a valve in said line outside of said tray.

3. An open refrigerated cooling tray for beverage glasses, comprising: a shallow rectangular metal tray lining; refrigerating coils beneath and around said tray lining formed of a plurality of turns of relatively small tubing; an interliner of non-metallic material providing a complete tray, including the refrigerating coils and adapted to provide collection and drainage for the frosting liquids as they are periodically defrosted; thermal insulating material above, around and beneath said non-metallic lining; an outer sheathing forming in itself a complete and third tray, providing a cover and a downwardly extending lip adapted to fit over and inside of the inner lining of the tray; an insulating gasket disposed to space said lip from the wall of the inner lining and adapted to prevent thermal transfer between the outer sheathing and the tray lining; a rack adapted to support beverage glasses and containers; insulating blocks secured to said rack, adapted to space said rack from the inner walls of said tray and from the bottom of said tray; a drain line from the glass cooling chamber of the tray.

VERONICA M. BOOKER.

REFERENCES CITED

The following references are of record in the file of this patent:

UNITED STATES PATENTS

| Number | Name | Date |
| --- | --- | --- |
| 1,955,186 | Hill | Apr. 17, 1934 |
| 2,084,883 | Atchison | June 22, 1937 |
| 2,155,284 | Steenstrup | Apr. 18, 1939 |